United States Patent
Dawson et al.

(10) Patent No.: US 8,231,347 B2
(45) Date of Patent: Jul. 31, 2012

(54) MASS-CENTRALIZING BLADE EXTENSION DRIVE MOUNT LOCATIONS FOR WIND TURBINE

(75) Inventors: Mark Dawson, Boise, ID (US); Jack Wallace, Yucaipa, CA (US)

(73) Assignee: Frontier Wind, LLC, West Conshohocken, PA (US)

( * ) Notice: Subject to any disclaimer, the term of this patent is extended or adjusted under 35 U.S.C. 154(b) by 711 days.

(21) Appl. No.: 12/365,392

(22) Filed: Feb. 4, 2009

(65) Prior Publication Data

US 2010/0196159 A1    Aug. 5, 2010

(51) Int. Cl.
*B63H 1/06*    (2006.01)
(52) U.S. Cl. .......................................... 416/87; 416/211
(58) Field of Classification Search .................. 416/87, 416/88, 89, 155, 157 B, 161, 211, 218
See application file for complete search history.

(56) References Cited

U.S. PATENT DOCUMENTS

| | | | |
|---|---|---|---|
| 5,636,969 A | 6/1997 | Matuska et al. | |
| 5,642,982 A | 7/1997 | Matuska et al. | |
| 6,726,439 B2 | 4/2004 | Mikhail et al. | |
| 6,902,370 B2 | 6/2005 | Dawson et al. | |
| 6,923,622 B1 | 8/2005 | Dehlsen | |
| 6,972,498 B2 | 12/2005 | Jamieson et al. | |
| 2003/0123973 A1* | 7/2003 | Murakami | 415/4.1 |
| 2003/0223868 A1* | 12/2003 | Dawson et al. | 416/1 |

\* cited by examiner

*Primary Examiner* — Cheung Lee
(74) *Attorney, Agent, or Firm* — Banner & Witcoff, Ltd.

(57) ABSTRACT

Drive units for variable-length rotor blades are located so as to move mass closer to the center of a wind turbine rotor. In some cases, drive units are located within a root portion of a base blade of a blade assembly. In other cases, drive units are located outside of the blade assemblies. In some such cases, drive units are contained within separate couplers used to connect blade assemblies to a wind turbine rotor hub. In other cases, one or more drive units are located within a rotor hub.

11 Claims, 18 Drawing Sheets

MASS-CENTRALIZING BLADE EXTENSION DRIVE MOUNT LOCATIONS FOR WIND TURBINE

BACKGROUND

Wind turbines create power proportional to the swept area of their blades. Wind turbines having longer blades will increase the swept area, which in turn produces more power. At high wind speeds, a wind turbine having longer blades places greater demands on the components and creates more situations where the turbine must be shut down to avoid damaging components. Even in situations where the average wind speed is not high enough to cause damage, periodic wind gusts apply forces that may be strong enough to damage equipment. Accordingly, choosing a rotor diameter for a wind turbine has conventionally been a design trade-off between longer blades for more energy production in low winds and shorter blades for load limitation in high winds.

Variable length rotor blade systems have also been used in an attempt to achieve higher power, and experience fewer shut downs and less damage to components. In such systems, the wind turbine rotor blades are telescopic so that their length can be adjusted based on the wind speed. The rotor blades can be extended to provide higher output in low wind conditions and retracted to lower loads in high wind conditions. U.S. Pat. No. 6,902,370 discloses a wind turbine system having telescoping wind turbine rotor blades.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In at least some embodiments, various challenges posed by a variable-length blade system in a wind turbine rotor are addressed by centrally locating certain blade extension/retraction components near the rotor rotational axis. In some embodiments, drive units for variable-length rotor blades are located within a root portion of a base blade of a blade assembly. In other embodiments, drive units are located outside of the blade assemblies. In some of these embodiments, drive units are contained within separate couplers used to connect blade assemblies to a wind turbine rotor hub. In still other embodiments, one or more drive units are located within a rotor hub.

BRIEF DESCRIPTION OF THE DRAWINGS

Some embodiments of the present invention are illustrated by way of example, and not by way of limitation, in the figures of the accompanying drawings and in which like reference numerals refer to similar elements.

DETAILED DESCRIPTION

This detailed description makes reference to the accompanying drawings that form a part hereof. The drawings show, by way of illustration, various embodiments in which the invention may be practiced. Other embodiments may be utilized and structural and functional modifications may be made without departing from the scope of the invention.

As indicated above, variable-length wind turbine rotor blades offer a way to achieve higher power output in low wind conditions and to avoid equipment damage in high wind conditions. Variable-length rotor blade systems also present many challenges, however. A mechanism used to extend or retract a rotor blade element adds to the total mass of the wind turbine rotor. The added mass imposes additional loads and stresses on the blades and on the wind turbine rotor as a whole. Moreover, most mechanisms used to extend and retract a rotor blade element will have components that may require periodic service and maintenance. Access to such components may be difficult when they are located deep within a blade.

In at least some embodiments, various challenges posed by a variable-length blade system in a wind turbine rotor are addressed by centrally locating certain blade extension/retraction components near the rotor rotational axis. As used herein, "rotor rotational axis" refers to the axis that is centered on the rotor hub and is generally orthogonal to the plane of the rotor. Moving mass toward the rotor center reduces stresses on the blades and on the blade-hub attachments. By locating extension/retraction components near the rotor center, access to such components for maintenance and repair is also facilitated.

Figure 1:
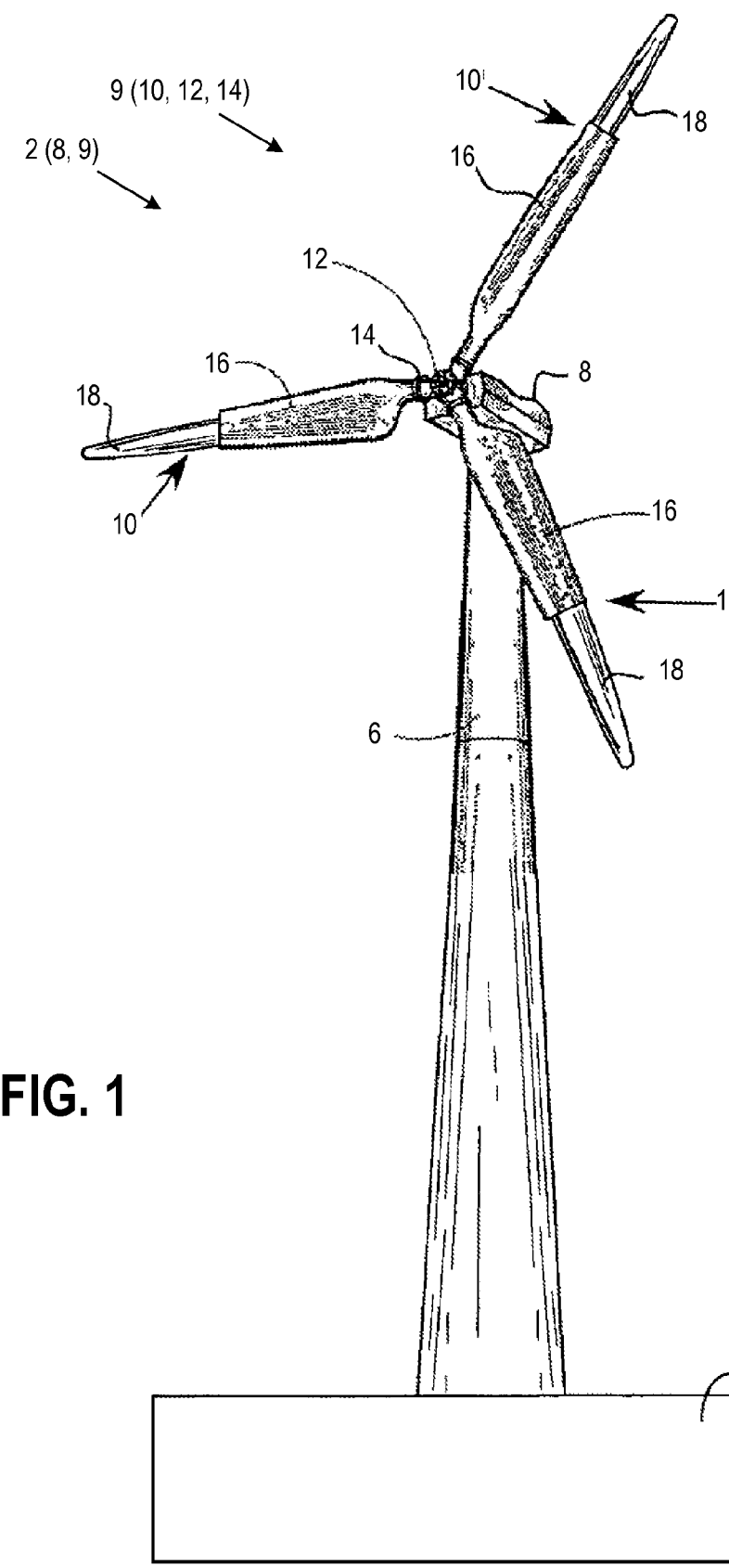
FIG. 1 shows a wind turbine atop a tower.

FIG. 1 shows a wind turbine 2 that includes a rotor 9 that is coupled to a nacelle 8. Nacelle 8 of wind turbine 2 is supported by a tower 6 that is anchored in a concrete base 4. Rotor 9 includes three blade assemblies 10 attached to a hub 12 via bolt flanges 14. Although wind turbine 2 of the FIG. 1 embodiment includes three blade assemblies 10, more or fewer blade assemblies can be used in other embodiments. Hub 12 of rotor 9 is coupled to a gear box, a generator, and other components within nacelle 8. Because various embodiments of the invention are directed to wind turbine rotors that can be used with nacelle 8, the remaining drawing figures will omit nacelle 8, tower 6 and base 4.

As seen in FIG. 1, each blade assembly 10 includes a base blade 16 and an associated end blade 18. As to each blade assembly 10, end blade 18 is telescopically movable with respect to its associated base blade 16 so as to controllably increase and decrease the overall length of the blade assembly, thereby increasing or decreasing the total swept area of the blade assemblies 10. Wind turbine 2 further includes a yaw drive and a yaw motor, not shown.

Figure 2:
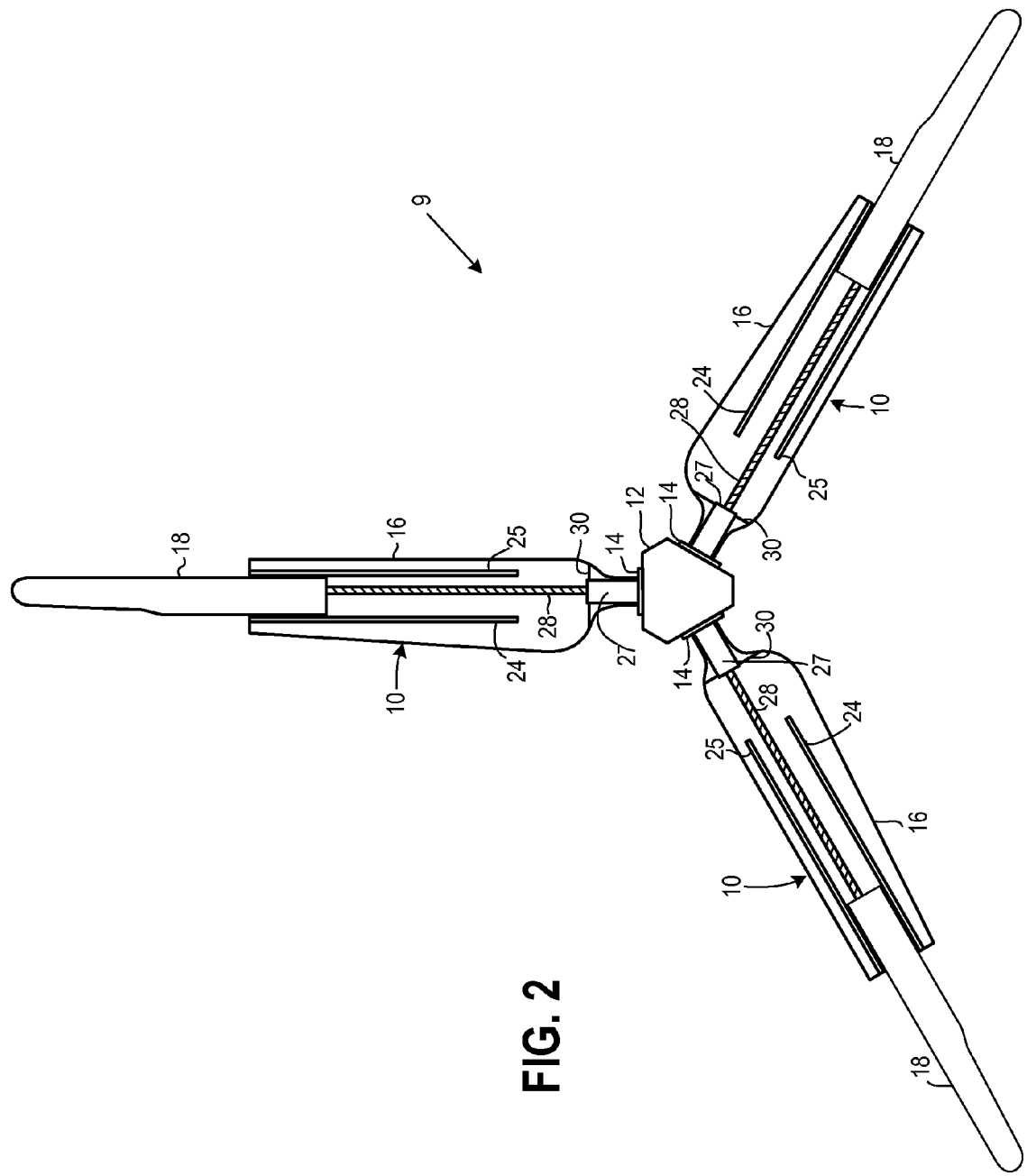
FIG. 2 is an enlarged frontal view of the rotor of the wind turbine in FIG. 1.
Figure 3:
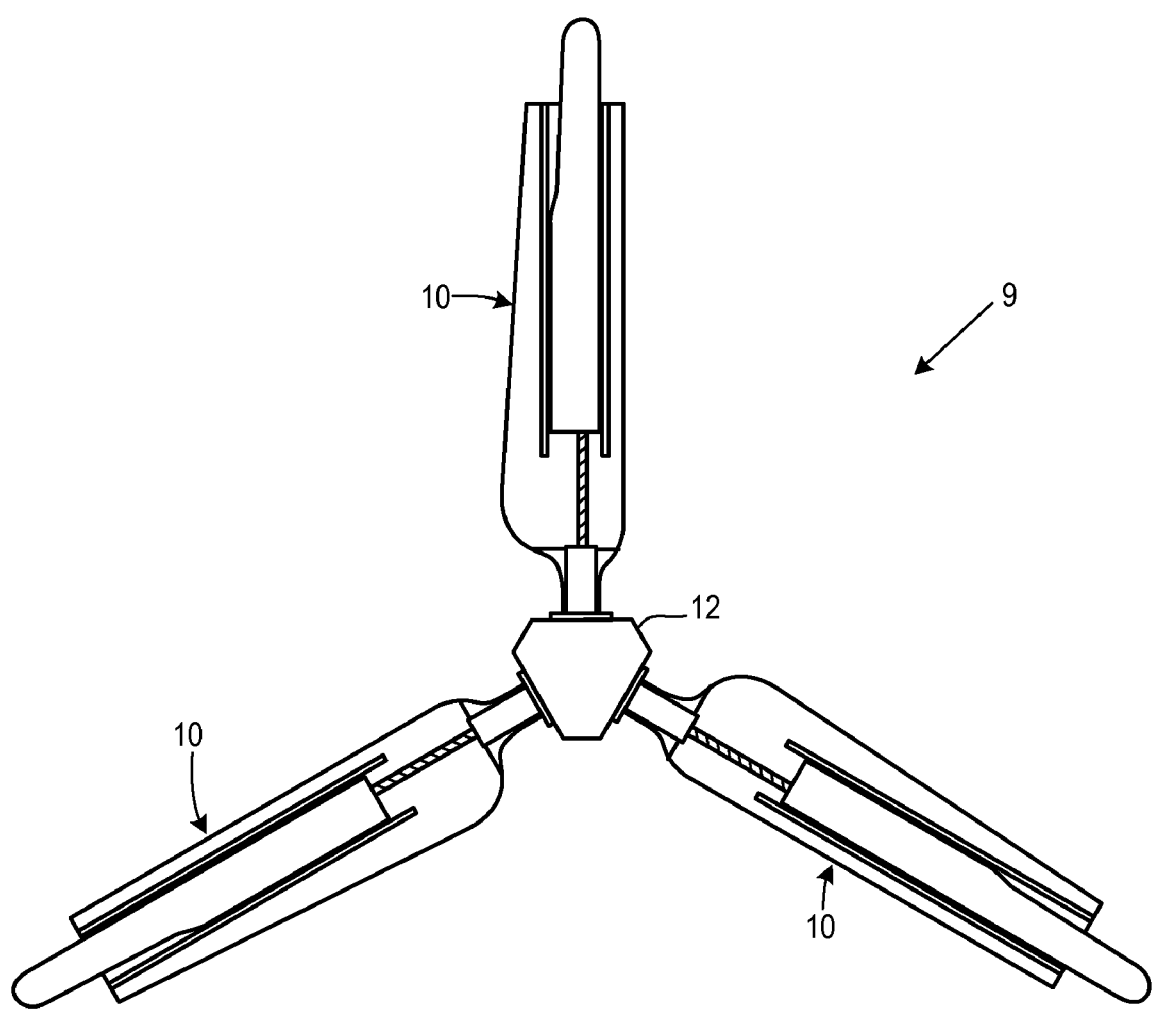
FIG. 3 shows the rotor of FIG. 2 in a configuration where the end blades have been retracted so as to be substantially contained within their associated base blades.

FIG. 2 is an enlarged frontal view of rotor 9 from FIG. 1. In FIG. 2, each blade assembly 10 is shown in a partially cross-sectional manner so as to expose various internal components. Each blade assembly 10 includes a linkage system through which applied force causes end blade 18 to extend from or retract within base blade 16. In the embodiment of FIG. 2, the linkage system includes a screw shaft, operation of which is described in connection with FIG. 4. Other drive systems can be used. Such systems include a piston and cylinder arrangement, a pulley and winch arrangement, a rack and pinion arrangement, etc. Such drive systems are described in U.S. Pat. No. 6,902,370, which is hereby incorporated by reference. Other numbered elements in FIG. 2 are described below in connection with FIG. 4. In FIG. 2, end blades 18 are extended from their associated base blades. FIG. 3 is similar to FIG. 2, but shows rotor 9 in a configuration where end blades 18 have been retracted so as to be substantially contained within their associated base blades 16.

Figure 4:
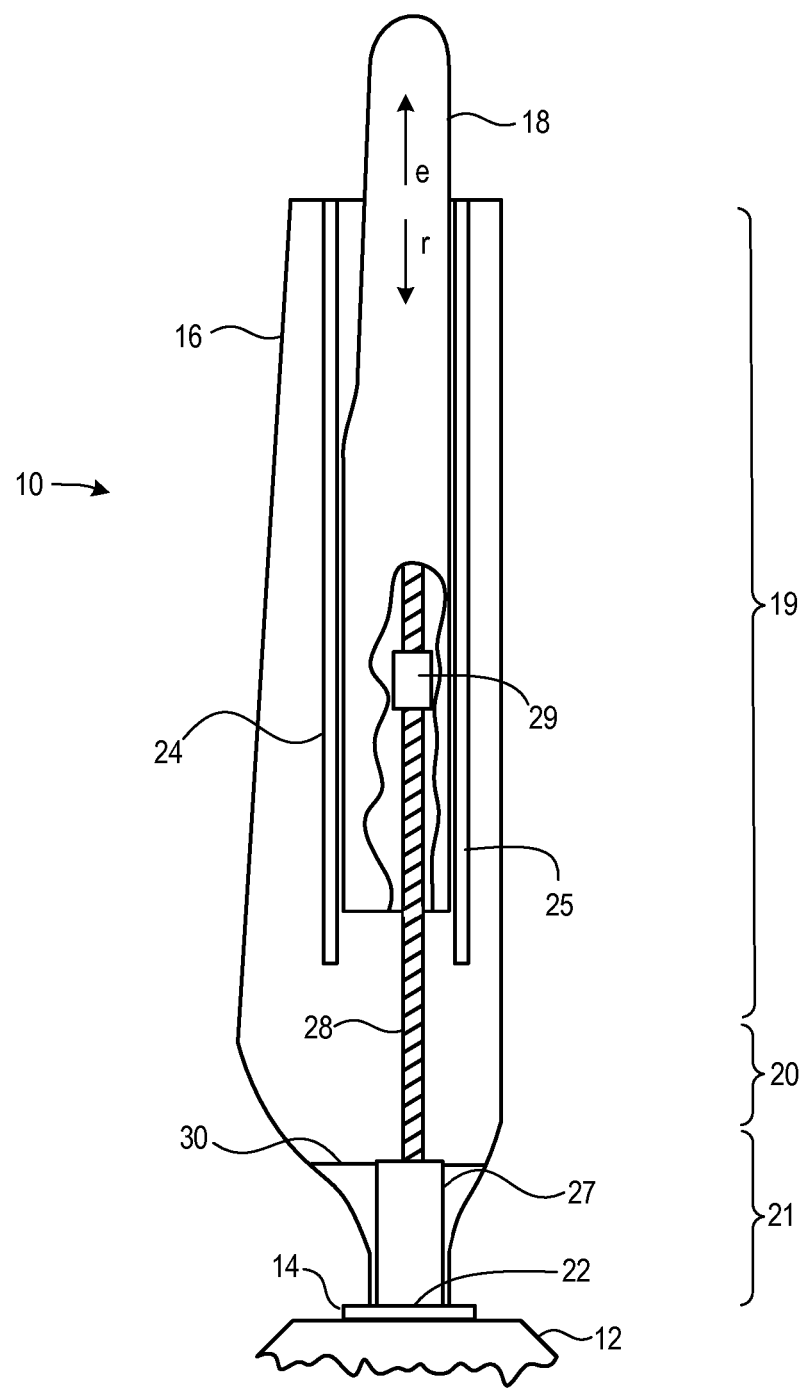
FIG. 4 is an enlarged view of one of blade assemblies from FIG. 3.

FIG. 4 is an enlarged view of one of blade assemblies 10 from FIG. 3, and with the majority of hub 12 removed. The other blade assemblies 10 of rotor 9 (not shown in FIG. 4) are substantially identical. Base blade 16 is generally divided into three portions. Main body 19 is generally-wing-shaped and provides most of the fluid working area against which wind applies force to base blade 16. In transitional region 20, base blade 16 loses its wing shape and transitions to a smaller cross-section. Root 21 connects the transitional region 20 to a mounting fixture used to couple blade assembly 10 to hub 12 or to an intermediate structure interposed between blade assembly 10 and hub 12. In the embodiments shown, that mounting fixture is a flange plate 14. Heel 22 is the portion of root 21 closest to the mounting fixture.

In the embodiment of FIGS. 1-4, end blade 18 is positioned between a pair of spars 24 and 25 fixedly attached within base blade 16. In addition to providing structural stiffness for base blade 16, spars 24 and 25 are positioned so as to also serve as guides for end blade 18. Spars 24 and 25 are generally parallel to the direction in which end blade 18 moves during extension (arrow "e") and to the direction in which end blade 18 moves during retraction (arrow "r"). Spars 24 and 25 also constrain end blade 18 from side-to-side motion in directions perpendicular to directions "e" and "r." Use of spars 24 and 25 as guides for end blade 18 can permit reduction of weight within base blade 16, as spars are typically needed for structural reasons independent of the presence of an extending end blade, and using such spars as guides allows elimination or reduction of other support and guide mechanisms.

As indicated above, screw shaft 28 is part of a linkage system through which applied force causes end blade 18 to extend or retract. Rotational force is applied to screw shaft 28 by a drive unit 27. Rotational force applied to screw shaft 28 is transferred to a drive nut 29 that is located within and coupled to end blade 18. This transferred force pushes or pulls end blade 18 relative to base blade 16.

Drive unit 27 includes a housing that contains an electrical motor. Drive unit 27 may also contain control circuitry and/or reduction gearing. Power may be provided to drive unit 27 in a variety of ways. In at least some embodiments, power supply cables from drive unit 27 are connected to exposed conductive regions on hub 12 or on a shaft to which hub 12 is attached. Brushes in (or extending from) nacelle 8 contact those conductive regions as hub 12 rotates so as to provide power from a source within nacelle 8. Similar techniques can be used to provide power to drive units in other embodiments described below.

As seen in FIG. 4, the housing for drive unit 27 is located in the root 21 of base blade 16 so as to move heavier components of the blade extension drive system toward the rotational axis of the rotor. In at least some embodiments, a proximal end of drive unit 27 is attached to base blade 16 at the heel 22. Bracing 30 connecting a distal end of drive unit 27 to base blade 16 stabilizes drive unit 27 within blade 16 when blade 10 is not completely vertical.

Figure 5:
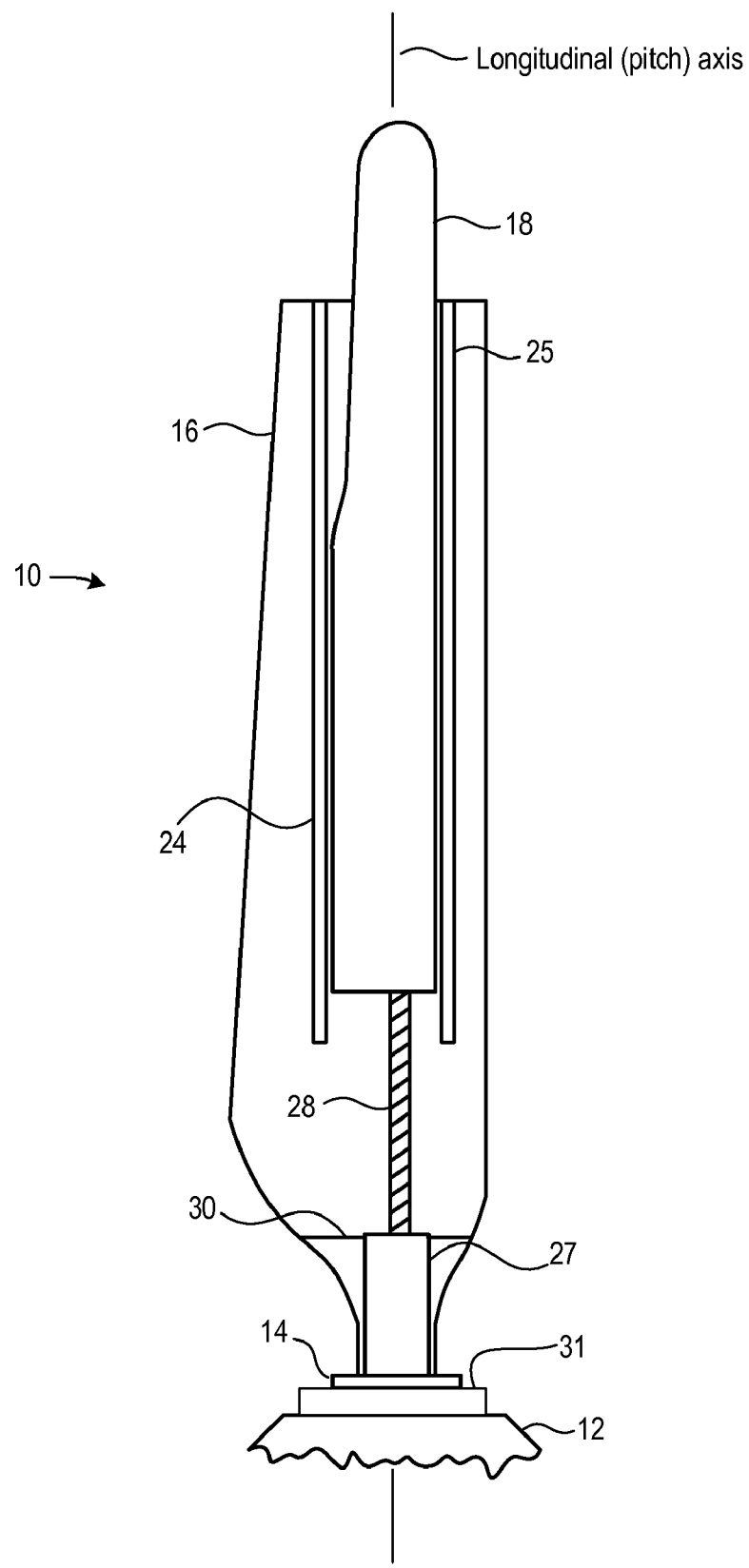
FIG. 5 is a partially cross-sectional view of a blade assembly according to another embodiment.

FIG. 5 is a partially cross-sectional view of blade assembly 10 in a slightly different embodiment. Blade assembly 10 of FIG. 5 is the same as blade assembly 10 of FIG. 4, except that a bearing plate 31 is interposed between flange plate 14 and hub 12. A similar bearing plate 31 is interposed between the flange plates 14 of other blade assemblies (not shown) and hub 12. Each bearing plate 31 permits rotation of an attached blade assembly 10 about a longitudinal axis extending along the length of the blade assembly, thereby permitting blade pitch adjustment.

Figure 6:
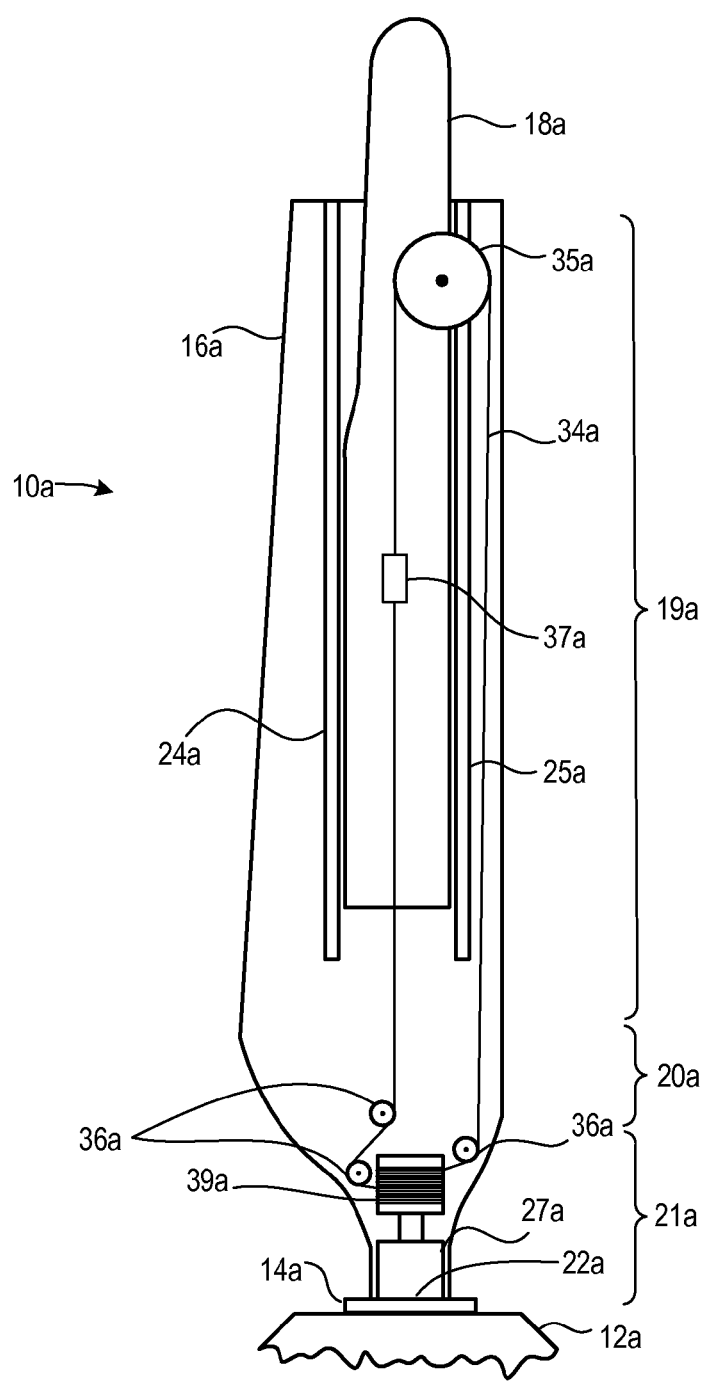
FIG. 6 is a partially cross-sectional view of a blade assembly according to yet another embodiment.

FIG. 6 is a partially cross-sectional view of a blade assembly 10a according to another embodiment. Features of blade assembly 10a that correspond to features of blade assembly 10 (FIGS. 2-5) have been given similar reference numbers with an appended "a" (e.g., end blade 18a of FIG. 6 generally corresponds to end blade 18 of FIGS. 2-5). Additional blade assemblies (not shown) identical to blade assembly 10a are also attached to hub 12a. In the embodiment of FIG. 6, a different mechanism is used to extend end blade 18a from, and retract end blade 18a within, base blade 16a. In the embodiment of FIG. 6, the linkage system through which applied force extends or retracts end blade 18a includes cable 34a. Cable 34a is double-wound onto a drum 39a and routed over a sheave 35a and through several smaller sheaves 36a. Cable 34a is connected to end blade 18a at an attachment point 37a. Tension force applied to one end of cable 34a causes end blade 18a to extend, while tension force applied to the other end of cable 34a causes end blade 18a to retract. Drum 39a is rotatable in opposite directions so as to apply tension forces to different ends of cable 34a. This rotation is caused by rotational force from drive unit 27a, which includes an electric motor, and which may also include control circuitry and/or gearing. Drive unit 27a is located in the root 21a of base blade 16a so as to move the more massive components of the blade drive system toward the rotor rotational axis. In at least some embodiments, drive unit 27a is attached to heel 22a. Cable routing sheaves 36a may act as tensioners to take up slack that develops in the cable system.

In other embodiments (not shown), a bearing plate such as bearing plate 31 (FIG. 5) can be interposed between flange plate 14a and hub 12a for each blade assembly 10a on a rotor.

In still other embodiments, one or more of the sheaves shown in FIG. 6 are eliminated by using guide tubes to route cable 34a over a desired path. In still other embodiments, the cable drum is oriented so that the cable spools onto (and off of) the drum in a direction that is more parallel to the length of the base blade.

Figure 7:
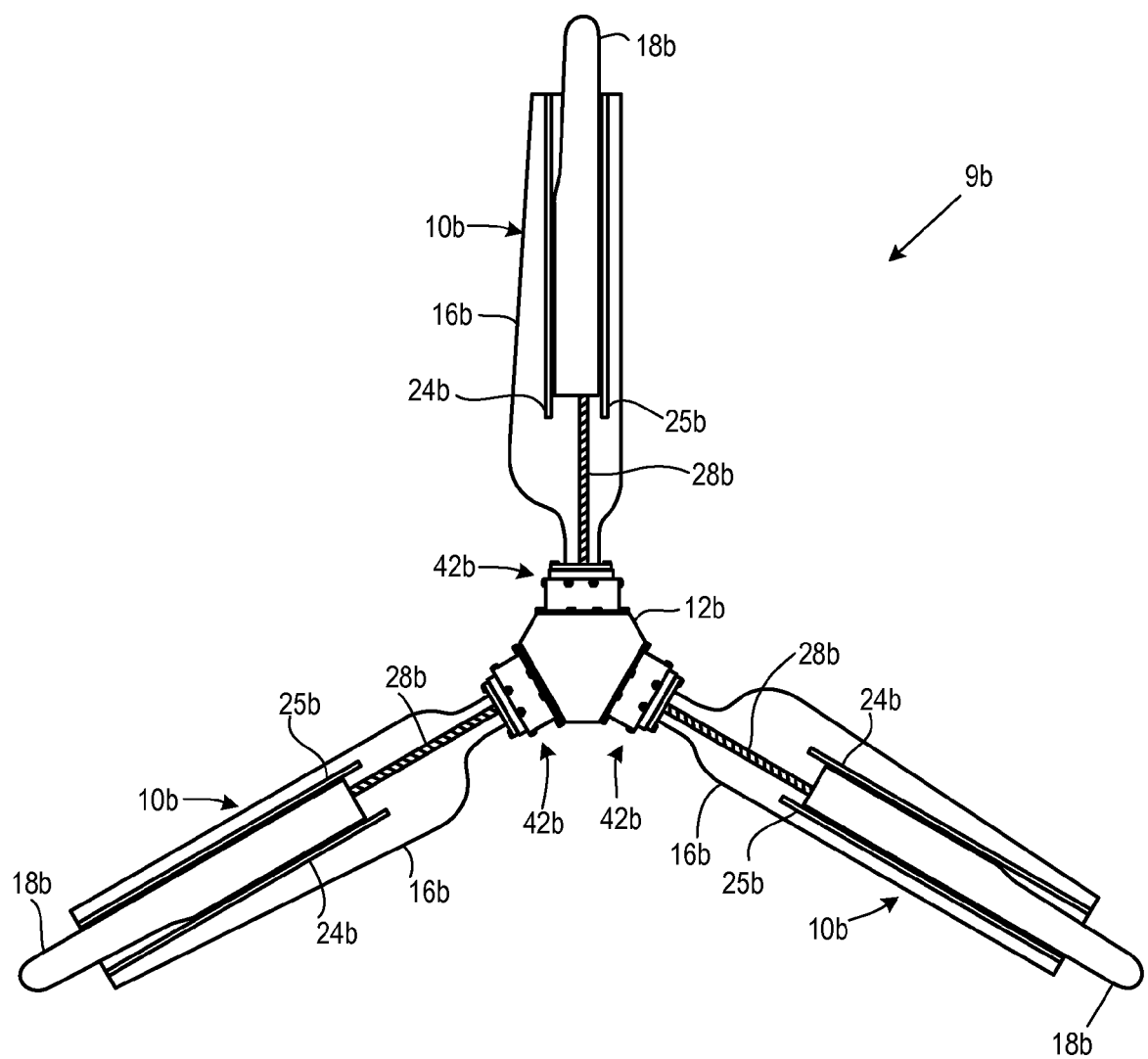
FIG. 7 is a partially cross-sectional front view of a wind turbine rotor according to a further embodiment.

FIG. 7 is a partially cross-sectional front view of a rotor 9b according to another embodiment. Rotor 9b includes three blade assemblies 10b (shown in partial cross section) coupled to a hub 12b. Features of rotor 9b and blade assemblies 10b that correspond to features of other embodiments have been given similar reference numbers with an appended "b." As with blade assemblies 10 in FIGS. 2-5, each blade assembly 10b includes a base blade 16b and a telescopically extending end blade 18b. Each end blade 18b is guided between two spars 24b and 25b. Rotational forces applied to the linkage assemblies that include screw shafts 28b cause end blades 18b to extend or retract. Unlike blade assemblies 10 of FIGS. 2-5, however, the drive units for screw shafts 28b are not located inside of base blades 16b. Instead, the blade extension drive unit for each blade assembly is contained in a blade-hub coupler 42b. As used herein, including the claims, a "blade-hub coupler" is a structure that connects a blade assembly to a wind turbine rotor hub. The connection may in some embodiments be such that the blade assembly is fixed relative to the hub. In other embodiments, the connection may be such that the blade assembly is movable relative to the hub (e.g., to adjust blade pitch).

Figure 8:
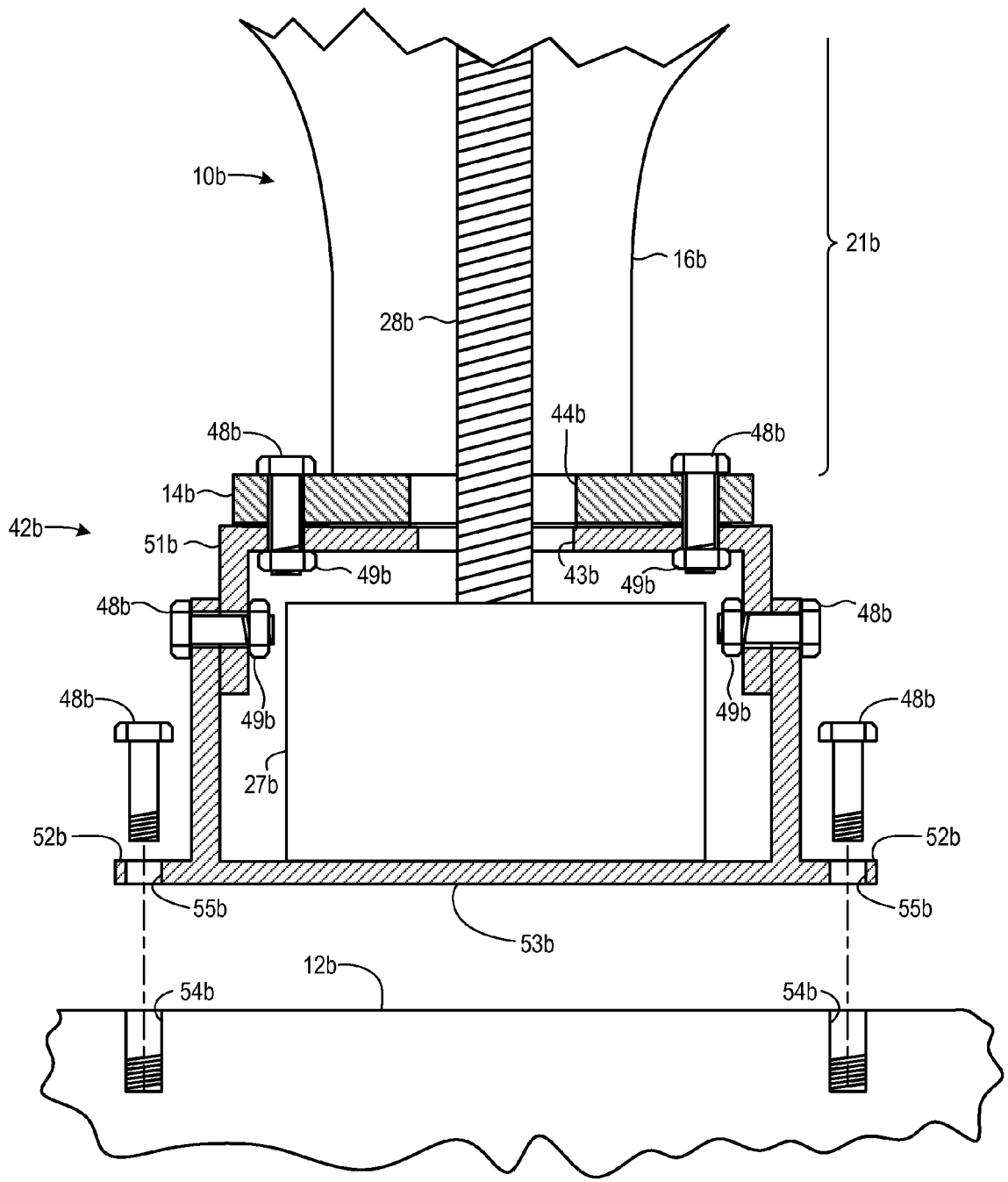
FIG. 8 is an enlarged cross-sectional view of a single blade-hub coupler and the root portion of an attached base blade from the wind turbine rotor FIG. 7.

FIG. 8 is an enlarged cross-sectional view of a single blade-hub coupler 42b and the root portion 21b of an attached base blade 16b. Unlike FIG. 7, coupler 42b is shown in partial cross-section in FIG. 8. A portion of hub 12b (also shown partial cross section) is included in FIG. 8, although other components of rotor 9b from FIG. 7 are omitted for convenience. Coupler 42b includes an upper housing 51b and a lower housing 53b. Flange plate 14b of blade assembly 10b is attached to upper housing 51b with bolts 48b and nuts 49b. Additional bolts 48b and nuts 49b attach upper housing 51b to lower housing 53b. Nuts 49b may be welded or otherwise fixed to the inside of upper housing 57b, or may be restrained within recesses that prevent nuts 49b from turning when bolts 48b are tightened. Lower housing 53b includes a flange 52b having holes 55b. Coupler 42b is attached to hub 12b by passing additional bolts 48b through holes 55b into threaded holes 54b in the mounting surface of hub 12b. Drive unit 27b, which is mounted inside housing 46b, receives screw shaft 28b through access holes 43b (in upper housing 51b) and 44b (in flange plate 14b).

As with the embodiments of FIGS. 2-6, the embodiment of FIGS. 7 and 8 moves the blade extension drive unit closer to the rotor center. Moreover, a hub mounting face to which a blade assembly will be attached (via a coupler) often has significantly more area than the internal portion of a base blade root. This permits a coupler housing, relative to a base blade root, to have a larger internal area available to accommodate the blade extension drive unit. This additional available area can permit a flatter arrangement of the drive unit components, and/or can provide more design freedom. For example, the additional area inside of a coupler housing could permit selection of a larger and more powerful drive unit than might be possible if that drive unit were mounted inside the base blade root. The arrangement of FIGS. 7 and 8 also permits relatively easy access to drive unit 27b and any other components contained in coupler 42b for maintenance and repair. Moreover, coupler 42b can be fully assembled and attached to blade assembly 10b while on the ground. The blade assembly and attached coupler can then be hoisted into place and easily attached to hub 12b by insertion of bolts through flange 52b.

Figure 9:
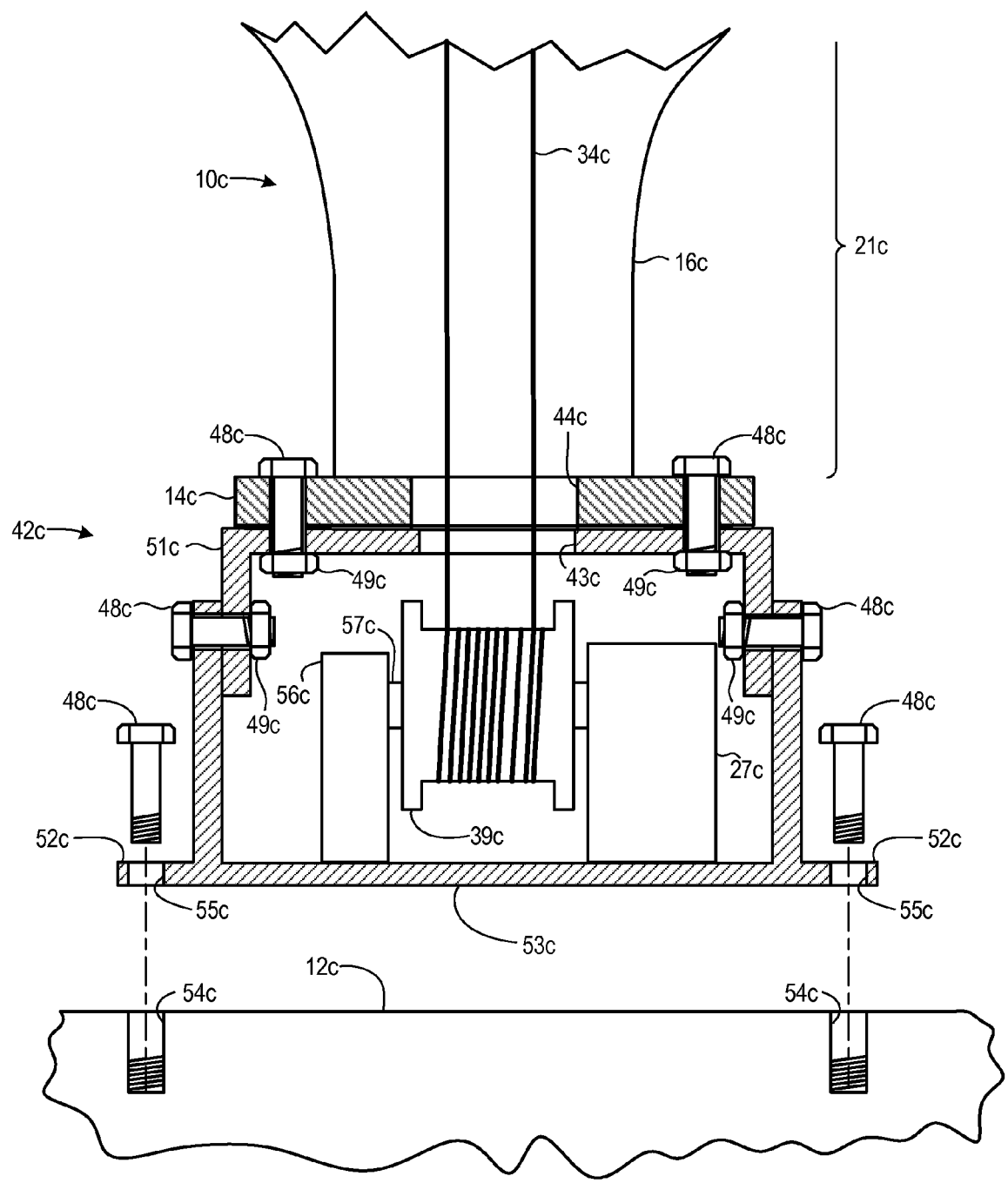
FIG. 9 is an enlarged cross-sectional view of a single blade-hub coupler and a root portion of an attached base blade according to another embodiment.

FIG. 9 is an enlarged cross-sectional view of a single blade-hub coupler 42c and the root portion 21c of an attached base blade 16c according to another embodiment. Features of the embodiment of FIG. 9 that correspond to features of other embodiments have been given similar reference numbers with an appended "c." Additional blade assemblies (not shown) identical to blade assembly 10c are also attached to hub 12c using couplers identical to coupler 42c. The embodiment of FIG. 9 is similar to the embodiment of FIGS. 7 and 8, except that a cable drive mechanism (similar to that shown in FIG. 6) is used to extend and retract an end blade (not shown) of blade assembly 10c. Unlike the embodiment of FIG. 6, however, the cable drum 39c has been located within coupler 42c. Because more space is available within coupler 42c than in the root of base blade 16c, drum 39c is located transverse to the ends of cable 34 extending from drum 39c instead of parallel to those cable ends. This orientation can permit one or more of the sheaves 36a, shown in FIG. 6, to be eliminated. As is further seen in FIG. 9, drum 39c is attached to a rotating shaft 57c supported by a bracket 56c.

The blade-hub couplers shown in FIGS. 7-9 are merely some examples of blade-hub couplers according to some embodiments. In other embodiments, for example, a blade-hub coupler may have a one-piece housing. In still other embodiments, a blade-hub coupler may have a housing with more than two pieces, and/or the housing pieces may be attached in a variety of ways other than with bolts. In yet other embodiments, a blade-hub coupler may take the form of a bracket having significant open regions exposing a drive unit and/or other components within the blade-hub coupler.

Figure 10:
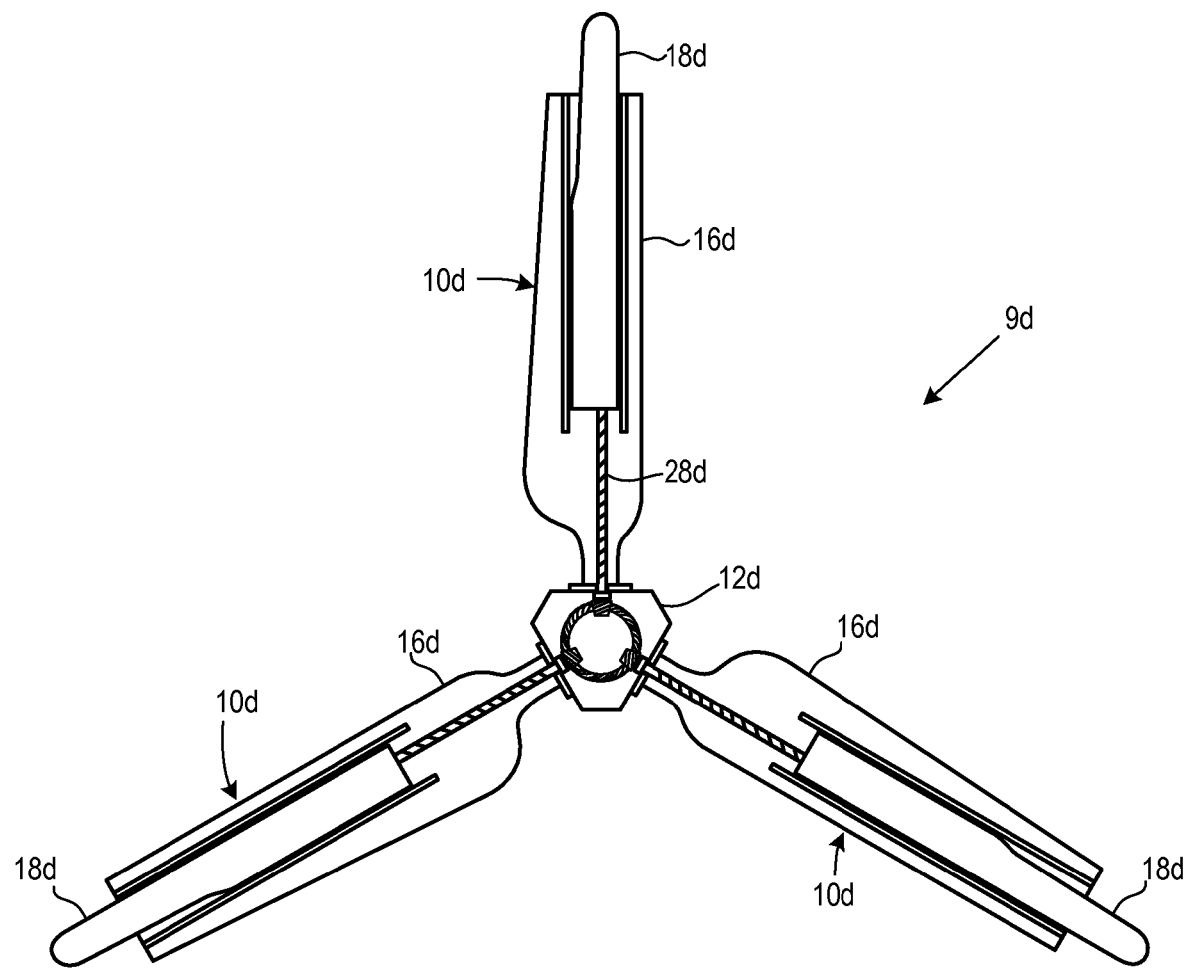
FIG. 10 is a cross-sectional front view of a wind turbine rotor according to an additional embodiment.
Figure 11:
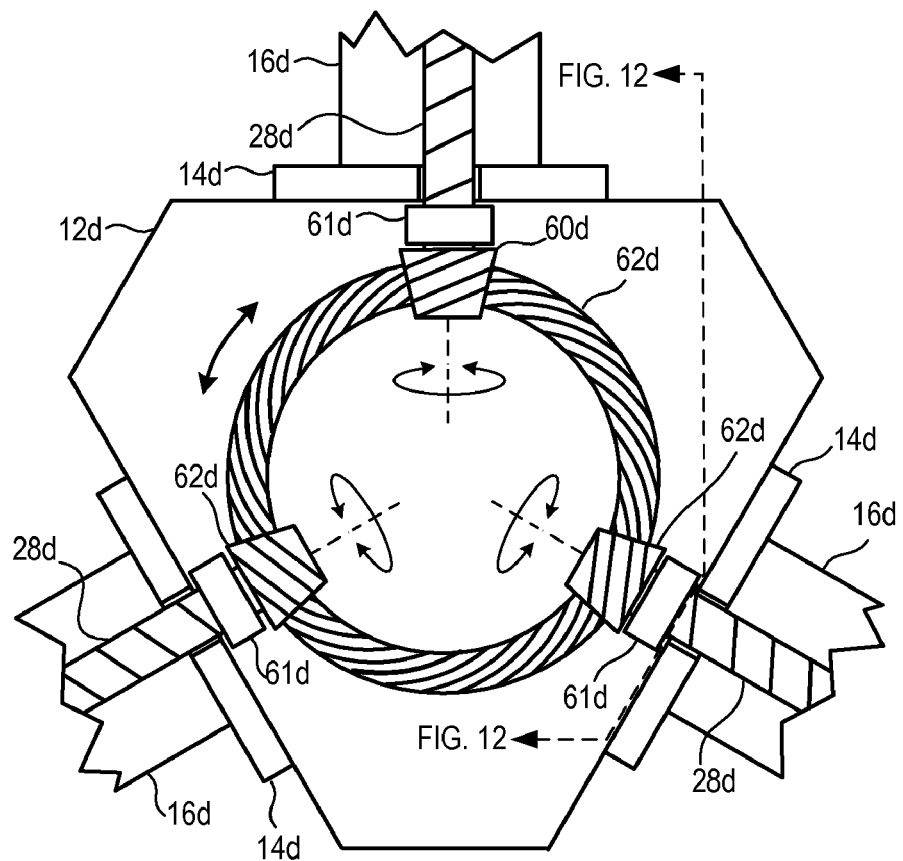
FIG. 11 is an enlarged view of the hub from the wind turbine rotor FIG. 10.
Figure 12:
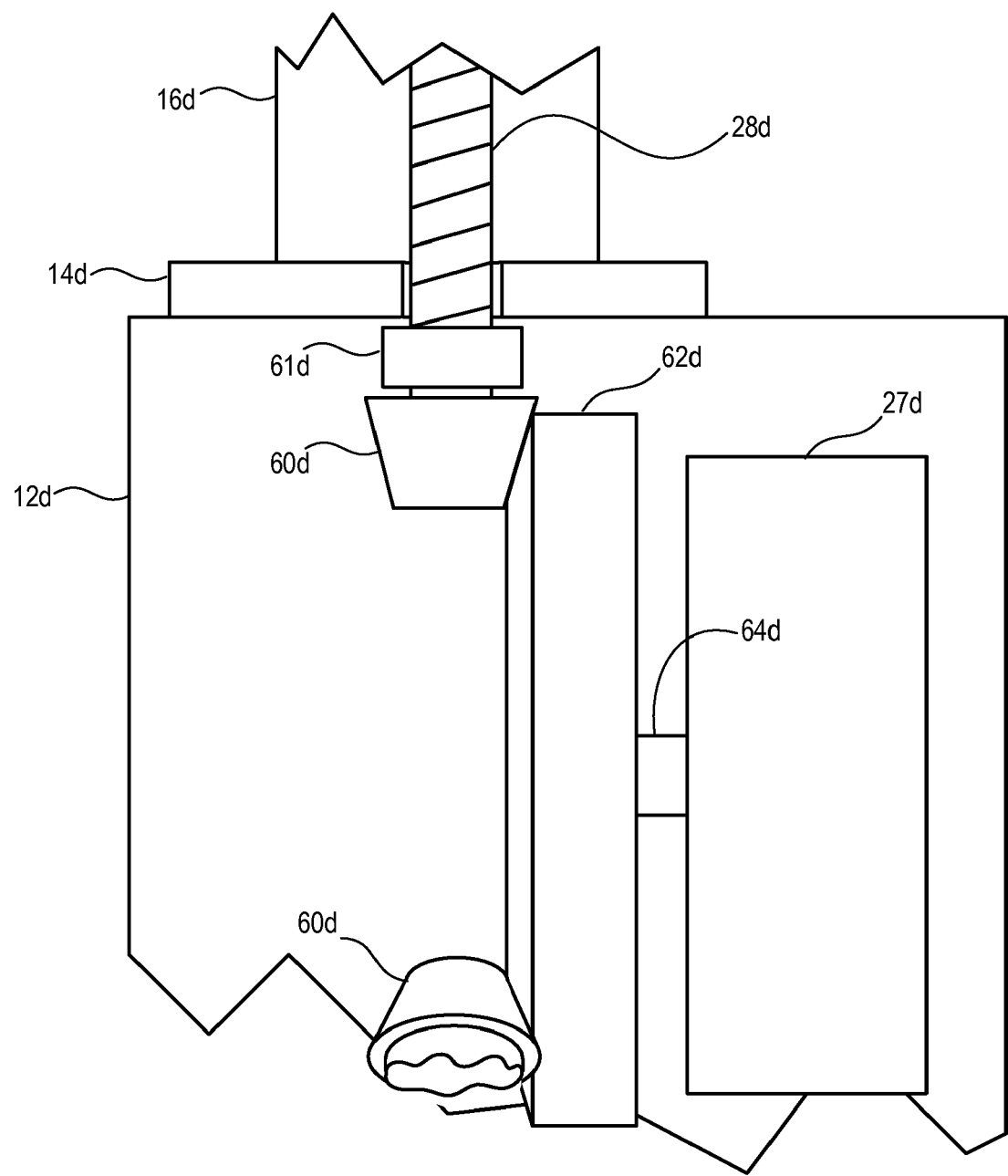
FIG. 12 is partial side cross-sectional view taken from the location shown in FIG. 11.

In some embodiments, mass of blade extension drive components is moved even further toward the rotor center by locating those components within the rotor hub. FIG. 10 is a cross-sectional front view of a rotor 9d according to one such embodiment. Rotor 9d includes three blade assemblies 10d coupled to a hub 12d. Blade assemblies 10d include screw drives 28d to extend or retract end blades 18d. Features of rotor 9d that correspond to features of other embodiments have been given similar reference numbers with an appended "d." FIG. 11 is an enlarged cross-sectional view of hub 12d. Each of blade assemblies 10d is attached to hub 12d by bolts (not shown) attaching flange plates 14d to hub 12d. The screw shaft 28d of each blade assembly extends into hub 12d and is attached to a bevel gear 60d by a shaft coupler 61d. Each of the bevel gears 60d is in contact with a ring bevel gear 62d. Rotating ring gear 62d in a first direction thus imparts a rotational force on each screw shaft 28d in a direction that causes end blades 18d (FIG. 10) to extend from base blades 16d. Rotating ring gear 62d in a second direction imparts a rotational force on each screw shaft 28d in an opposite direction and causes end blades 18d to retract. FIG. 12 is partial side cross-sectional view of hub 12d taken from the location shown in FIG. 11. Ring gear 62d is coupled to a drive unit 27d via a shaft 64d.

Figure 13:
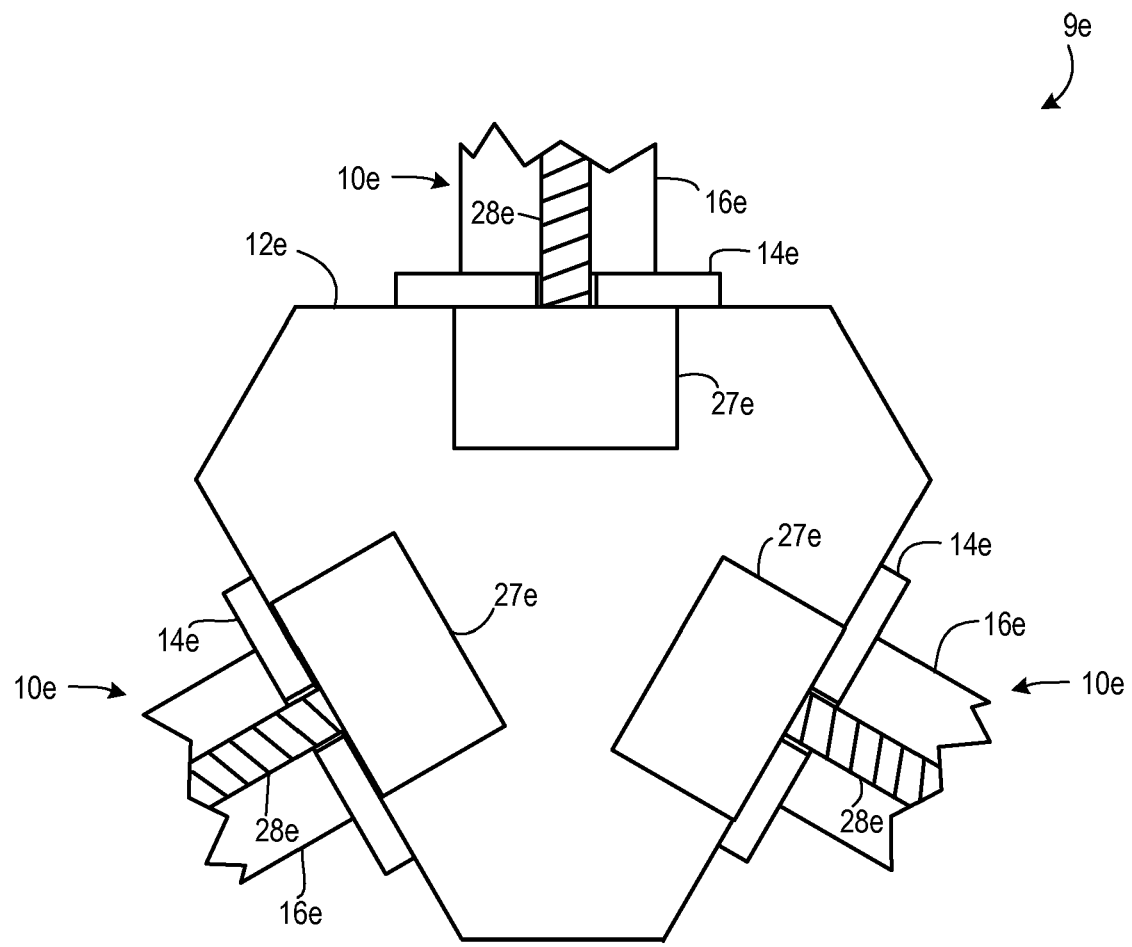
FIG. 13 is a front cross-sectional view of a hub and portions of blade assemblies from a wind turbine rotor according to an additional embodiment.

FIG. 13 is a front cross-sectional view of a hub 12e and portions of blade assemblies 10e of rotor 9e according to another embodiment. Features of rotor 9e that correspond to features of other embodiments have been given similar reference numbers with an appended "e." Blade assemblies 10e are substantially identical to blade assemblies 10d of FIG. 10. As in the embodiments of FIGS. 10-12, blade assemblies 10e include screw drives 28e to extend and retract end blades (not shown). Instead of a single drive unit that turns all three screw drives, however, each screw drive 28*e* is coupled to a separate drive unit 27*e* located within hub 12*e*.

Figure 14:
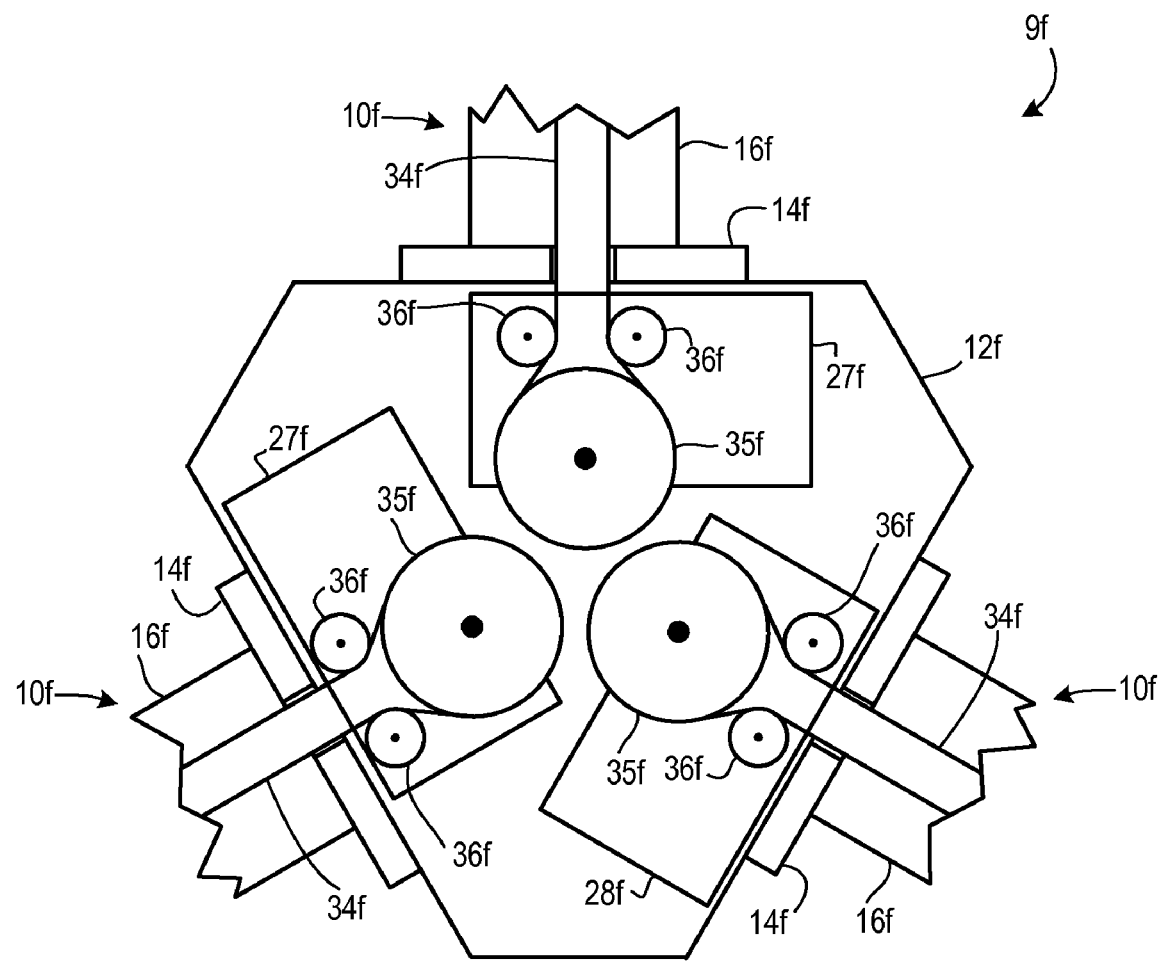
FIG. 14 is a front cross-sectional view of a hub and portions of blade assemblies of a wind turbine rotor according to another embodiment.

FIG. 14 is a front cross-sectional view of a hub 12*f* and portions of blade assemblies 10*f* of a rotor 9*f* according to a further embodiment. Features of rotor 9*f* that correspond to features of other embodiments have been given similar reference numbers with an appended "f." In the embodiment of FIG. 14, each blade assembly 10*f* includes an end blade (not shown) that is extended and retracted by a cable 34*f* that is double wound on a drum 39*f*. Each drum 39*f* is further coupled to a separate drive unit 27*f*. Cable 34*f* from each blade assembly 10*f* is routed to drum 39*f* between a pair of sheaves 36*f*.

Figure 15:
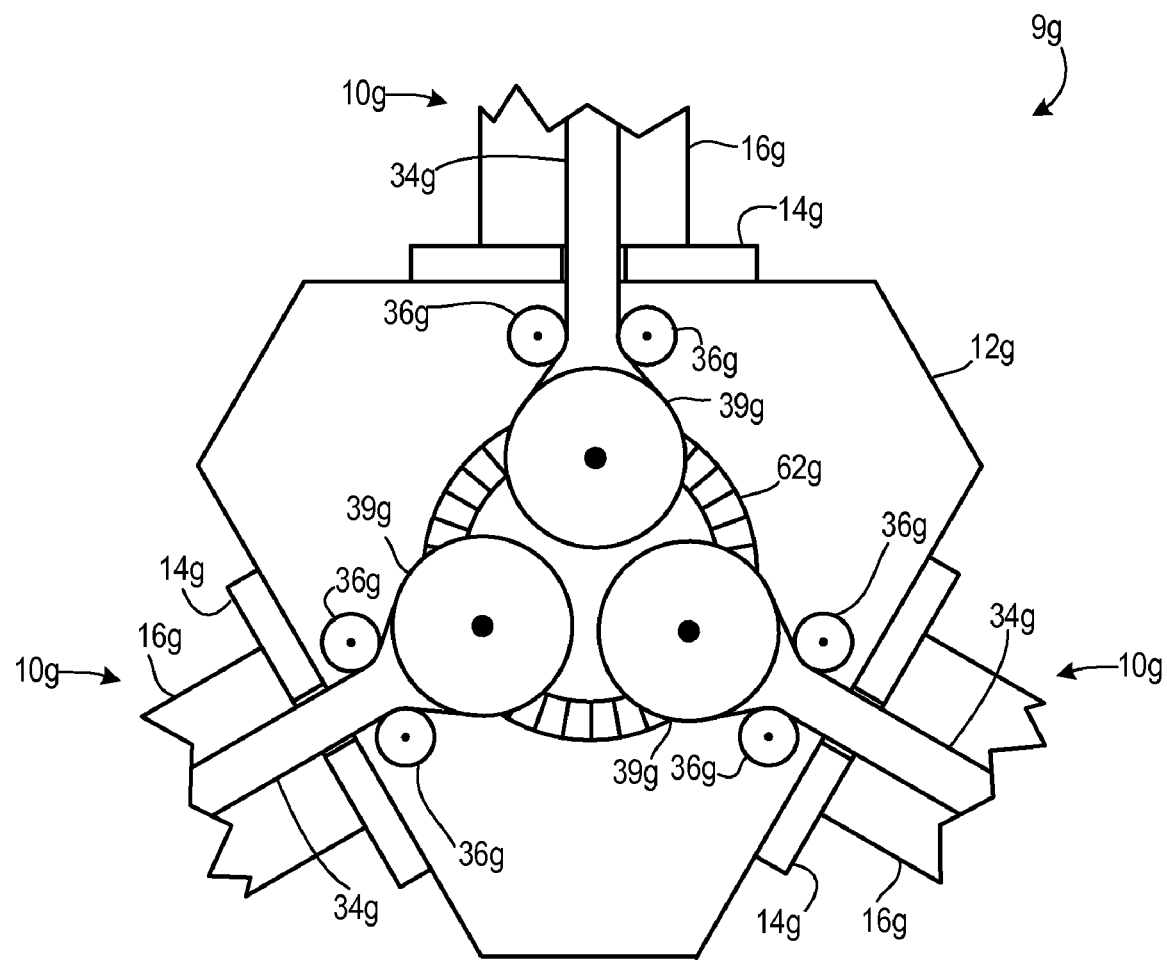
FIG. 15 is a front cross sectional view of a hub and portions of blade assemblies of a wind turbine rotor according to a variation on the embodiment of FIG. 14.
Figure 16:
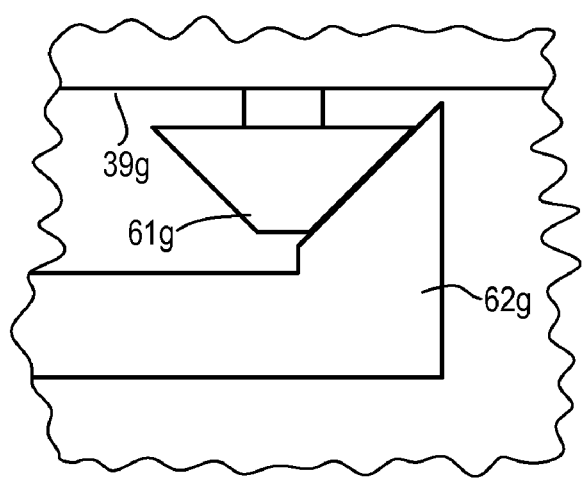
FIG. 16 is a partial side view of a bevel gear and a portion of the ring gear from FIG. 15.

FIG. 15 is a front cross sectional view of a hub 12*g* and portions of blade assemblies 10*g* of a rotor 9*g* according to a variation on the embodiment of FIG. 14. Features of rotor 9*g* that correspond to features of other embodiments have been given similar reference numbers with an appended "g." In the embodiment of FIG. 15, there is not a separate drive unit corresponding to each blade assembly. Instead, each drum 39*g* is coupled to a bevel gear 60*g* (not shown in FIG. 15), with each of those bevel gears being turned by a ring bevel gear 62*g*. FIG. 16 is a partial side view of one such bevel gear 60*g* and a portion of ring gear 62*g*.

Figure 17:
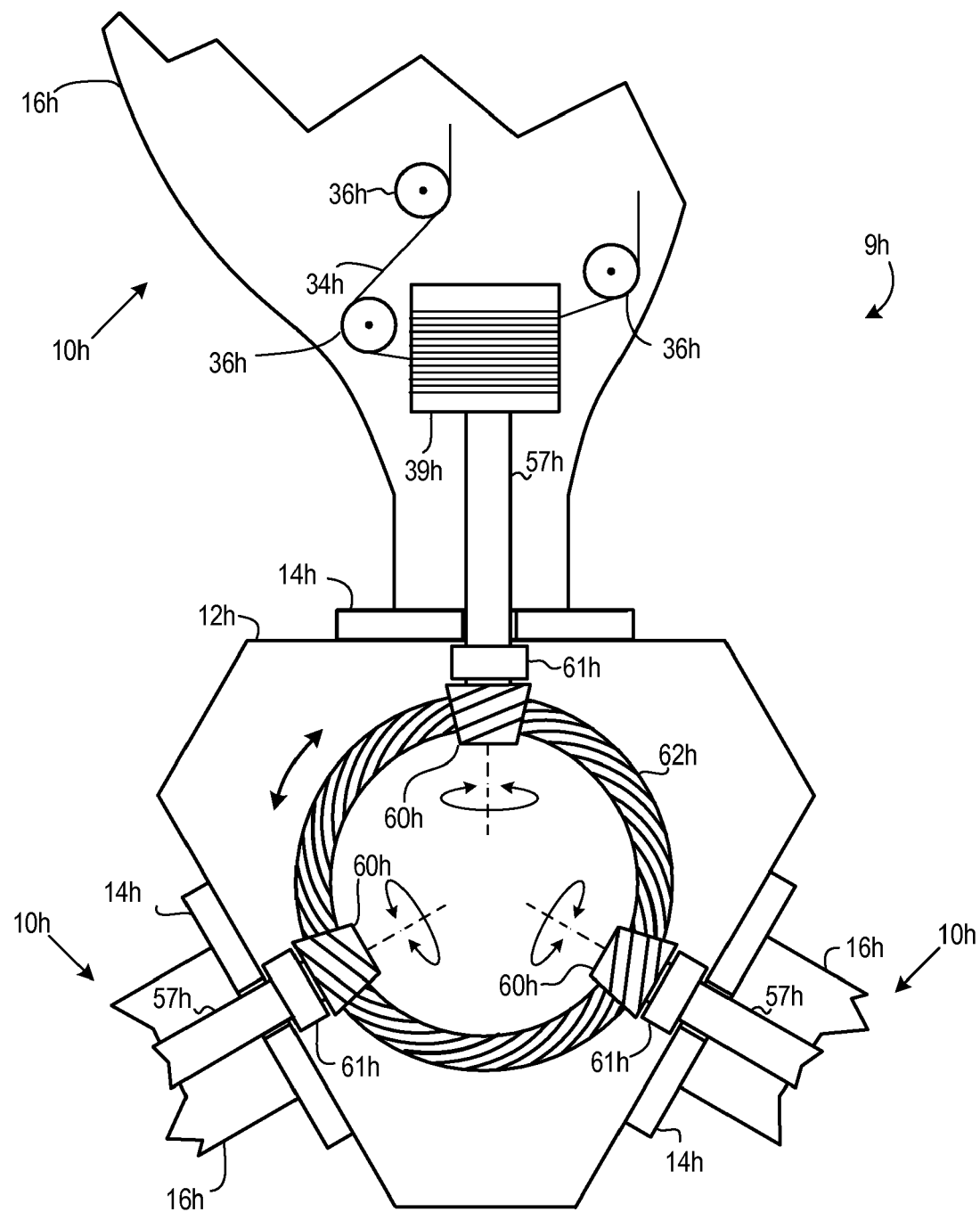
FIG. 17 is a front cross sectional view of a hub and portions of blade assemblies of a wind turbine rotor according to an embodiment that combines aspects of the embodiments of FIGS. 6 and 10-12.

FIG. 17 is a front cross sectional view of a hub 12*h* and portions of blade assemblies 10*h* of a rotor 9*h* according to an embodiment that combines aspects of the embodiments of FIGS. 6 and 10-12. Features of rotor 9*h* that correspond to features of other embodiments have been given similar reference numbers with an appended "h." In the embodiment of FIG. 17, each blade assembly 10*h* includes an end blade (not shown) that is extended and retracted by a cable 34*h* that is double wound on a drum 39*h*. Like the embodiment of FIG. 6, drum 39*h* is located in the root of the base blade 16*h* of blade assembly 10*h*. Like the embodiment of FIGS. 10-12, however, a single drive unit corresponding to all blade assemblies is located in hub 12*h*. That drive unit rotates a ring bevel gear 62*h* that turns bevel gears 60*h*, thus causing simultaneous rotation each drum 39*h*. The drive unit is not visible in FIG. 17, but is coupled to ring gear 62*g* in a manner similar to that in which drive unit 27*d* is coupled to ring gear 62*d* in FIG. 12.

The embodiment of FIG. 17 may facilitate easier installation of a blade assembly on a hub. This can be important, as such installation may occur after the hub is attached to a nacelle at the top of a tower. Instead of routing cables from a blade assembly into a hub and rigging those cables to components inside the hub, all cables are pre-rigged and contained within the blade assembly. This permits installation of the blade assembly on a hub by connection of shaft 57*h* to a coupler 61*h* and bolting of flange plate 14*h* to hub 12*h*.

Figure 18A:
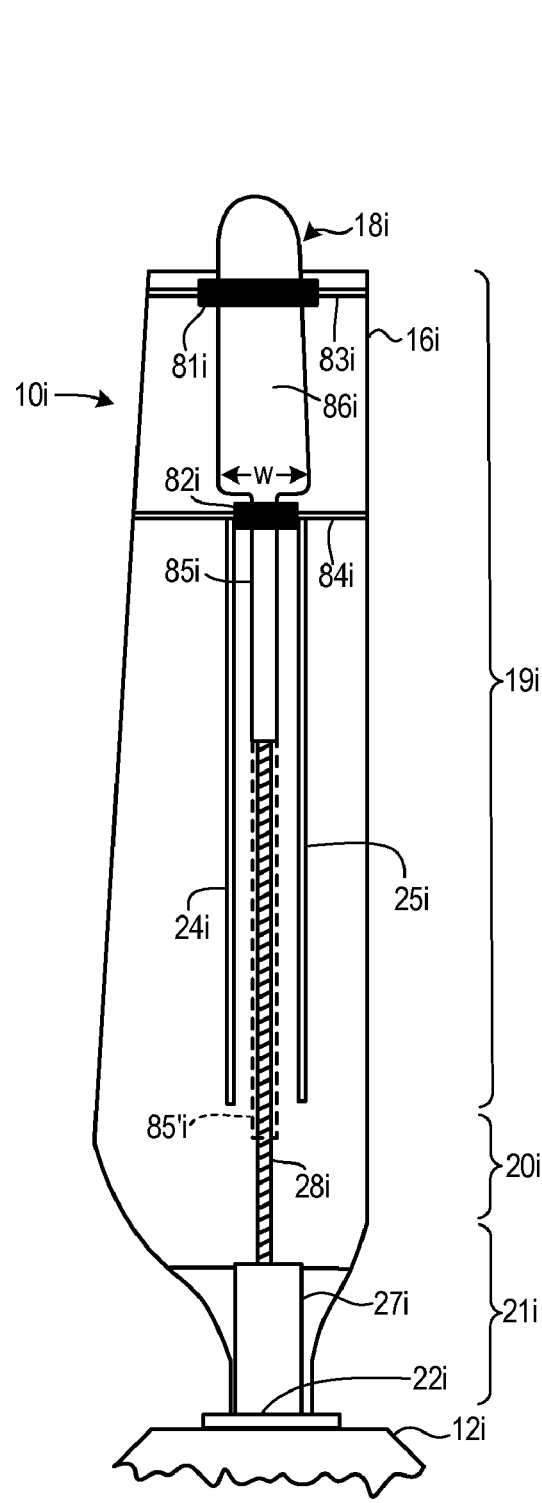
FIGS. 18A and 18B are partially cross-sectional views of a blade assembly according to another embodiment.
Figure 18B:
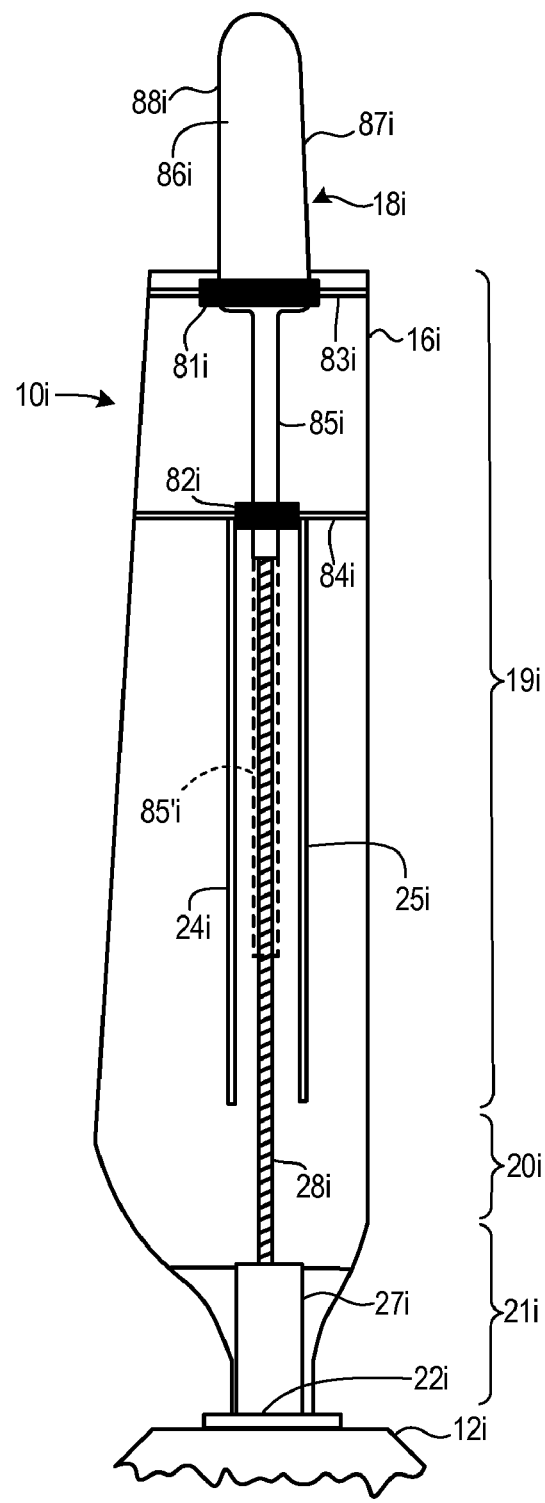

FIGS. 18A and 18B are partially cross-sectional views of a blade assembly 10*i* according to another embodiment. Similar to previous drawings, FIGS. 18A and 18B show blade assembly 10*i* coupled to a rotor hub 12*i* (only a portion of which is shown). Additional blade assemblies 10*i*, not shown in FIGS. 18A and 18B, are also coupled to hub 12*i* so as to form a complete rotor. Base blade 16*i* has an outer shape that is generally similar to that of base blades in previous drawings. End blade 18*i* has a broad outboard portion 86*i* and a much narrower inboard portion 85*i*. Other features of blade assembly 10*i* that correspond to features of other embodiments have been given similar reference numbers with an appended "i."

Unlike the embodiments of previous figures in which an end blade is supported at its edges by longitudinal spars of a base blade, end blade 18*i* is supported by an outer bearing 81*i* and an inner bearing 82*i*. Outer bearing 81*i* is positioned transversely to the extension/retraction directions of end blade 18*i* and supports end blade 18*i* primarily on its faces instead of its edges. Inner bearing 82*i* is similarly positioned transversely to the extension/retraction direction and supports inboard portion 85*i*. Bearings 81*i* and 82*i* are supported by ribs 83*i* and 84*i*, respectively, of base blade 16*i*. A screw shaft 28*i* is rotated by a drive unit 27*i* and acts on a drive nut (not shown) within inboard portion 85*i* of end blade 18*i* to extend and retract end blade 18*i* relative to base blade 16*i*. Other embodiments include blade assemblies similar to assembly 10*i*, but which utilize a different type of linkage system (e.g., a cable system similar to that described in connection with FIG. 6).

A blade assembly configuration such as that of assembly 10*i* offers numerous advantages that can help reduce outboard mass in a wind turbine rotor. Unlike certain configurations in which base blade spars support the end blade at its edges, the configuration of assembly 10*i* permits longitudinal spars 24*i* and 25*i* to be located more closely together. In the embodiment of FIGS. 18A and 18B, for example, longitudinal support spars 24*i* and 25*i* have a relative spacing that is narrower than the widest width w end blade 18*i*. This can permit more efficient (and lighter) structural design for the base blade, thereby reducing the total blade assembly mass. The configuration of assembly 10*i* also avoids a need for spars 24*i* and 25*i* to extend the full length of the base blade, further reducing outboard mass. The shape of end blade 18*i* also reduces the size of the end blade that remains inside the base blade, which also reduces outboard system mass. The shape of bearing 81*i* is such that most support force is applied against the broad faces of outboard portion 86*i* extending between leading edge 87*i* and trailing edge 88*i* instead of against leading edge 87*i* and trailing edge 88*i*. Because the faces of outboard portion 86*i* are typically strong so as to withstand wind force, leading edge 87*i* and trailing edge 88*i* can be of lighter construction than might otherwise be required (i.e., edge reinforcing for bearing reaction is not needed), even further reducing outboard mass in assembly 10*i*. Because inboard portion 85*i* of end blade 18*i* is of substantially smaller cross-sectional area than outboard portion 86*i*, inboard bearing 82*i* can be smaller than outboard bearing 81*i*.

With minor modification, the configuration of FIGS. 18A and 18B permits use of a shorter drive screw shafts 28*i* (or shorter runs of other types of linkage systems) by extending the length of inboard portion 85*i* of end blade 18*i*. This is shown in FIGS. 18A and 18B by broken line 85'*i*. This offers additional mass-centralizing advantages in some embodiments where the weight/length of a screw shaft (or other linkage) is greater than the weight/length of an inboard end blade portion.

Although the drive units of various ones of the above-described embodiments include electric motors, other types of motors can be used in other embodiments. Such other motor types include, for example, hydraulically- or pneumatically-powered devices.

Numerous characteristics, advantages and embodiments have been described in detail in the foregoing description with reference to the accompanying drawings. However, the above description and drawings are illustrative only. The invention is not limited to the illustrated embodiments, and all embodiments of the invention need not necessarily achieve all of the advantages or purposes, or possess all characteristics, identified herein. Various changes and modifications may be effected by one skilled in the art without departing from the scope or spirit of the invention. The elements and uses of the above-described embodiments can be rearranged and combined in manners other than specifically described above, with any and all permutations within the scope of the invention. As used herein (including the claims), "coupled" includes two components that are attached (either fixedly or movably) by one or more intermediate components.

The invention claimed is:

1. An apparatus comprising:
   a wind turbine rotor hub;
   a plurality of blade assemblies, each of the blade assemblies including a base blade coupled to the hub and an associated end blade housed at least partially within the base blade, each of the end blades having a linkage system configured to extend and retract the end blade relative to its associated base blade in response to applied force;
   means for applying force to the linkage systems, wherein the force-applying means is located outside of the blade assemblies; and
   a plurality of blade-hub couplers, each of the blade-hub couplers connecting a different one of the blade assemblies to the hub, wherein means for applying force comprises a plurality of drive units, and wherein each of the drive units
      is located within a different one of the blade-hub couplers,
      includes at least one motor, and
      is configured to apply force to the linkage system of the blade assembly connected to the hub by the blade-hub coupler in which the drive unit is located.

2. The apparatus of claim 1, wherein the linkage system of each blade assembly comprises a screw shaft rotatable in one direction so as to cause extension of the end blade of the blade assembly and rotatable in the opposite direction so as to cause retraction of the end blade, and wherein each of the drive units is configured to apply a rotational force to a different one the linkage systems.

3. The apparatus of claim 1, wherein the linkage system of each blade assembly comprises at least one cable, and wherein each of the drive units is configured to apply a tension force to the at least one cable of a different one of the linkage systems.

4. The apparatus of claim 1, wherein for each blade assembly
   the linkage system comprises at least one cable,
   the at least one cable is wound around a drum, and
   the drive unit located within the blade-hub coupler connecting the blade assembly to the hub is operable rotate the drum.

5. The apparatus of claim 4, wherein for each blade assembly the drum is located within the blade-hub coupler connecting the blade assembly to the hub.

6. The apparatus of claim 1, wherein the force-applying means comprises a plurality of force applying means.

7. The apparatus of claim 6, wherein the plurality of force-applying means is located between the blade assemblies and the hub.

8. The apparatus of claim 1, wherein:
   each of the end blades is supported by an outboard bearing oriented transverse to directions of extension and retraction of the end blade relative to its associated base blade, said outboard bearing positioned to apply supporting force to faces of the end blade extending between leading and trailing edges of the end blade, and
   each of the end blades is further supported by an inboard bearing oriented transverse to the directions of extension and retraction the end blade relative to its associated base blade.

9. The apparatus of claim 8, wherein each of the end blades has an outboard portion configured to extend from its associated base blade and an inboard portion of substantially reduced cross-sectional area relative to the outboard portion.

10. The apparatus claim 9, wherein, as to each of the end blades, the inboard bearing is smaller than the outboard bearing.

11. The apparatus of claim 10, wherein each of the base blades includes a plurality of longitudinal support spars having a relative spacing that is narrower than the widest width of the end blade associated with the base blade.

* * * * *